March 1, 1949.  R. J. HARKER  2,462,961
PROPELLER BLADE VIBRATION ABSORBER
Filed Jan. 24, 1945
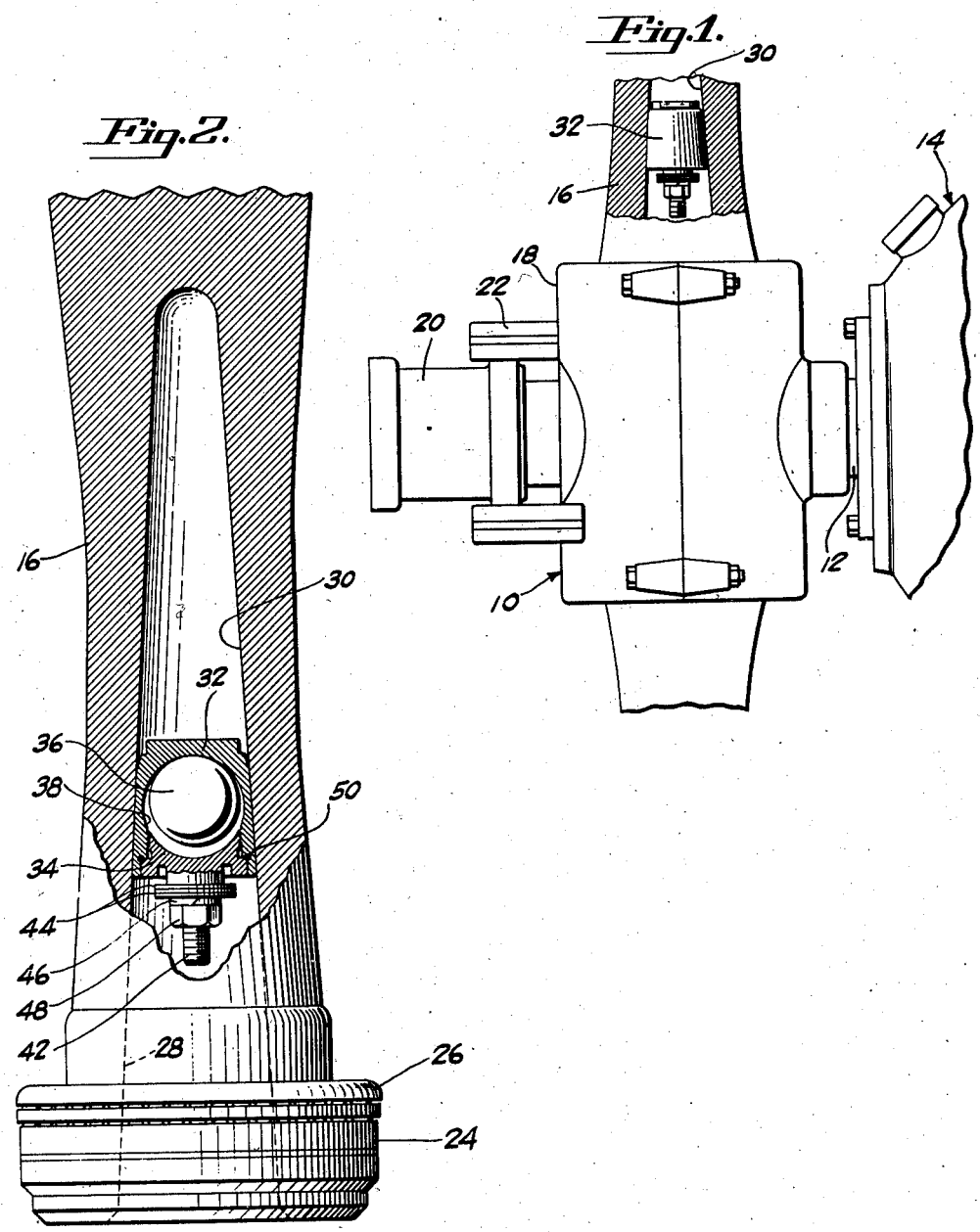
INVENTOR
*Ralph J. Harker*
BY
ATTORNEY Patented Mar. 1, 1949

2,462,961

UNITED STATES PATENT OFFICE 2,462,961

PROPELLER BLADE VIBRATION ABSORBER

Ralph J. Harker, Glastonbury, Conn., assignor to United Aircraft Corporation, East Hartford, Conn., a corporation of Delaware Application January 24, 1945, Serial No. 574,280

6 Claims. (Cl. 170—159)

This invention relates to improvements in aeronautical propellers and has particular reference to improved means for providing a vibration damping force.

An object of the invention resides in the provision of improved means carried directly by the propeller blades for providing a vibration damping force.

Another object is to provide improved vibration absorbing means which is effective irrespective of the propeller blade angle.

A still further object resides in the provision of improved vibration absorbing means of the character indicated which will effectively absorb vibrations of a selected order and in any direction transverse to the propeller blades.

Further and other objects and advantages will be apparent from the specification and claims and from the drawing which illustrates what is now considered to be a preferred embodiment of the invention.

In the drawing,

Fig. 1 is an elevational view of the center portion of an aeronautical propeller, a portion of one of the fragmentary blade portions being broken away and shown in section to illustrate the application of the improved vibration absorbing device thereto, and Fig. 2 is a sectional view of a hollow metal propeller blade showing the application thereto of an improved vibration absorber constructed according to the invention.

Referring to the drawing in detail, 10 generally indicates an aeronautical propeller mounted upon a drive shaft 12 projecting from a propeller driving engine generally indicated at 14. The propeller has a plurality of hollow or partly hollow metal blades, as indicated at 16, secured at their base or root ends in a hub barrel 18. The form of propeller illustrated is a controllable-pitch propeller such as is more particularly illustrated and described in United States Patent No. 2,032,255, issued February 25, 1936, to Frank W. Caldwell for Propellers, and may have an hydraulic mechanism 20 for rotating the blades to change the propeller pitch in one direction against the action of centrifugally actuated counterweights 22 which urge the blades in the opposite direction. Each blade has a hollow base portion terminating in an outwardly directed flange 24 upon which is disposed an anti-friction thrust bearing 26 which reacts against an overlying portion (not shown) of the barrel 18 to retain the blades in the propeller hub against the action of centrifugal force and permit free rotation of the blades by the pitch changing mechanism.

In the form of blade shown, the blade cavity 28 opens at the base end of the blade and extends for only a portion of the blade length, being discontinued at the point where the substantially cylindrical shank portion of the blade fairs into the comparatively thin section forming the main blade portion. This cavity has tapering side walls 30 which act as a seat for the casing 32 of the vibration absorber.

It will be understood, however, that the cavity in which the vibration absorber is located may have different shapes and locations. For instance, the blade may be provided with a transverse hole into which the absorber may be placed as has been more particularly described and claimed in my copending application Serial No. 618,693 filed September 26, 1945.

The absorber comprises three main parts; namely, a casing 32, a closure member 34, and an active member, in this case a sphere 36.

The casing or shell 32 is in the form of a truncated cone adapted to snugly fit the taper bore in the shank of the blade. The shell 32 is hollow and is provided internally with a cup-shaped, preferably spherical, seat 38 at the closed end. The sphere 36 is held against the spherical seat 38 by centrifugal force during operation of the propeller. The spherical seat has a larger radius than the sphere and the relative sizes of the seat and the sphere are proportioned to provide damping for a selected order of vibration.

The open end of the casing 32 is closed by the plug 34 which is threaded into the open end after the sphere 36 has been placed in the cavity. The inner surface of the plug 34 may, if desired, be shaped to give the entire cavity a substantially spherical shape. The plug 34 is locked in position by locking means, not shown. The plug member 34 carries a stud 42 on which balancing weights 44 may be held by means of a nut 48 and a lock washer 46. Oil is prevented from entering the spherical cavity in the casing 32 by seal 50.

When the propeller blade is subject to vibration, the vibratory movements are transmitted to the member 36. This may be briefly described as follows: Vibration producing force applied to the blade at a natural frequency of the blade will normally cause resonant vibratory movement of the blade which will lag the force producing it by a time phase angle of approximately 90° or one-quarter of the vibration cycle. The movement of the blade will cause relative movement of the sphere 36 and its seat 38, the inertia of the sphere in effect holding it against movement during the initial movement of the blade, so that the movement of the sphere lags the blade movement by approximately 90° and, hence lags the vibration producing force by approximately 180° so that it directly opposes the vibration producing force. As the member 36 moves relative to the casing 32 from its central position as illustrated in Fig. 2, it does so on the spherical surface 38, and as the radius of surface 38 is less than the distance from that surface to the axis of the shaft 12 about which the propeller rotates the member 36 is thereby constrained to move inwardly against the action of centrifugal force. Because the member 36 is displaced from its neutral position, the centrifugal force produces a transverse thrust against the casing 32 which is in turn transmitted to the blade shank 30. By the proper selection of member 36 and of the geometry of the spherical race 38, this transverse thrust can be made to provide a damping force on the blade and to reduce the severity of blade vibration at the frequency which is objectionable. The construction above described provides a simple unitary vibration absorber that may be placed in any blade having the correctly shaped bore. Placing the absorber inside the blade shank provides a structure which not only is out of sight, but one which also efficiently damps propeller vibrations. Once the design has been determined, that design will provide an absorber tuned to any selected number of vibrations per revolution of the propeller, which is commonly known as a vibration order and the absorber will remain tuned to that order irrespective of the speed of rotation. Since the ball rides in a spherical race, the absorber can operate satisfactorily regardless of the rotation of the blades by the pitch changing mechanism. The axis about which the blade changes its pitch preferably passes through substantially the center of the spherical race.

Hence, regardless of the angle to which the propeller blade may be adjusted or the frequency with which it is adjusted, the ball will continue to ride in its spherical seat and continue to provide the same damping force and oppose the vibration producing force with undiminished effectiveness.

While a particular mechanical arrangement has been hereinabove described and illustrated in the accompanying drawing for the purpose of disclosing the invention, it is to be understood that the invention is not limited to the particular construction so illustrated and described, but that such changes in the size, shape and arrangement of the various parts may be resorted to as come within the scope of the subjoined claims.

I claim:

1. An aeronautical propeller blade adapted to be rotated about an axis and having a shank portion and a blade portion and having a longitudinally extending bore in the shank portion forming a supporting surface for a vibration absorber, a tuned vibration absorber in said bore comprising a loose sphere freely movable on a seat in said bore, a curved concave seat for said sphere in said bore with the concave portion facing the shank end of said blade to support said sphere against centrifugal action when the propeller is rotating about said axis, said seat being held against outward movement under the action of centrifugal force by surrounding blade material, said curved concave seat having a minimum radius greater than the radius of said sphere and a maximum radius less than the radius of rotation of said seat about said axis and a closure member for said seat for retaining said sphere within said bore.

2. A propeller as claimed in claim 1 having blades mounted for pitch changing movement about a pitch changing axis passing through substantially the center of curvature of said curved seat, and means for changing the propeller pitch during rotation of said propeller.

3. An aeronautical propeller blade adapted to be rotated about an axis and having a shank portion and a blade portion and having a longitudinally extending bore in the shank portion, a tuned vibration absorber unit in said bore comprising, a casing, a curved concave seat in said casing, a loose sphere freely movable on said seat, said seat facing the shank end of said blade to support said sphere against centrifugal action when the propeller is rotating about said axis, said casing being movable outwardly in said bore, casing engaging surfaces in said shank portion limiting the outward movement of said casing under the action of centrifugal force, said curved concave seat having a minimum radius greater than the radius of said sphere and a maximum radius less than the radius of rotation of said seat about said axis.

4. In combination, an aeronautical propeller blade rotatable about an axis and having a shank portion and a blade portion and having a longitudinally extending tapered bore in the shank portion, a tuned vibration absorber in said bore comprising an insert having an exterior taper conformed to the taper of said bore and a curved concave sphere supporting surface formed on the face of said insert facing the shank end of the blade, a sphere freely movable on said surface, said curved concave surface having a minimum radius greater than the radius of said sphere and a maximum radius less than the radius of rotation of said surface about said axis, said tapered bore reducing as it extends radially outward and acting as means to retain said insert in said bore under the action of centrifugal force with the sphere supporting surface facing the shank end of said blade.

5. A propeller as claimed in claim 4 having blades mounted for pitch changing movement about a pitch changing axis passing through substantially the center of curvature of said curved surface, and means for changing the propeller pitch during rotation of said propeller.

6. A self-contained vibration absorber unit, a rotatable element having a radially extending tapered bore supporting said unit, said unit comprising an insert having a frustro-conical outer surface adapted to be positioned within said bore by the action of centrifugal force, said unit having an internal cavity having a curved concave surface facing the larger end of said frustrum, a loose sphere having a radius smaller than the radius of said surface freely movable in said cavity, a cover member secured to said insert, closing the open end of said cavity, retaining said sphere in said cavity and forming an oil tight joint with said insert.

RALPH J. HARKER.

REFERENCES CITED

The following references are of record in the file of this patent:

UNITED STATES PATENTS

| Number | Name | Date |
|---|---|---|
| 1,833,751 | Kimball | Nov. 24, 1931 |
| 2,339,624 | Davis | Jan. 18, 1944 |
| 2,349,187 | Meyer | May 16, 1944 |
| 2,426,400 | Lampton et al. | Aug. 26, 1947 |